United States Patent [19]

Gorowitz et al.

[11] Patent Number: 5,576,925
[45] Date of Patent: Nov. 19, 1996

[54] FLEXIBLE MULTILAYER THIN FILM CAPACITORS

[75] Inventors: Bernard Gorowitz, Clifton Park; Paul A. McConnelee, Schenectady; Michael W. DeVre, Scotia; Stefan J. Rzad, Rexford, all of N.Y.; Ernest W. Litch, Ft. Wayne, Ind.

[73] Assignee: General Electric Company, Schenectady, N.Y.

[21] Appl. No.: 364,640

[22] Filed: Dec. 27, 1994

[51] Int. Cl.$^6$ ............................ H01G 4/005; H01G 4/06
[52] U.S. Cl. ............ 361/301.2; 361/311; 361/312; 361/313; 361/321.2; 361/306.3
[58] Field of Search ............................ 361/301.1, 301.2, 361/301.3, 301.5, 306.3, 313, 321.2, 317, 311, 312, 301.4, 298.3; 29/25.03

[56] References Cited

U.S. PATENT DOCUMENTS

| 3,686,523 | 8/1972 | Gordon et al. |
|---|---|---|
| 3,793,569 | 2/1974 | Maijers et al. ............ 361/517 |
| 4,376,329 | 3/1983 | Behn . |
| 4,378,382 | 3/1983 | Behn . |
| 4,508,049 | 4/1985 | Behn et al. . |
| 5,370,766 | 12/1994 | Desaigoudar et al. ............ 156/643 |
| 5,450,263 | 9/1995 | Desaigoudar et al. ............ 360/110 |

FOREIGN PATENT DOCUMENTS

| 0186765 | 7/1986 | European Pat. Off. ............ 361/306.3 |
|---|---|---|
| 3222938A | 1/1983 | Germany ............ 361/321.3 |
| A1202806 | 8/1989 | Japan . |
| 2-121313A | 5/1990 | Japan ............ 361/313 |
| 2-222124 | 9/1990 | Japan ............ 361/313 |
| 314218 | 2/1991 | Japan . |

OTHER PUBLICATIONS

U.S. Patent Application, "Low–Profile Capacitor and Low–Profile Integrated Capacitor/Heatspreader" By Fisher, et al, Ser. No. 08/214,508 Filed Mar. 18, 1994.
"Advanced Materials For High Energy Density Capacitors" By S J Rzad, et al, 1992 IEEE 35th International Power Sources Symposium, Jun. 22–25, 1992, pp. 358–362.
"A New High Temperature Multilayer Capacitor With Acrylate Dielectrics" By Angelo Yializis, et al, IEEE Dec. 1990, vol. 13, No. 4, pp. 611–615.
"Dielectric Properties of Carbon Films From Plasma Enhanced Chemical Vapor Deposition".
"Multilevel DLC (Diamondlike Carbon) Capacitor Structure", J L Davidson, et al, SPIE vol. 871, Space Structures, Power & Power Conditioning (1988), pp. 308–312.
"Japanese Kokai Patent Application No. HEI 1[189]–202806," filed Feb. 8, 1988 Translation.

Primary Examiner—Leo P. Picard
Assistant Examiner—Anthony Dinkins
Attorney, Agent, or Firm—Ann M. Agosti; Marvin Snyder

[57] ABSTRACT

A flexible, multilayer thin film capacitor comprises a flexible substrate and at least two electrode layers mounted on the substrate alternately with at least one dielectric layer. The dielectric layer may include amorphous hydrogenated carbon. The at least two electrode layers and the at least one dielectric layer are capable of acting as at least one capacitor, and the flexible substrate is capable of being manipulated so as to have a desired shape.

18 Claims, 8 Drawing Sheets

FLEXIBLE MULTILAYER THIN FILM CAPACITORS

CROSS-REFERENCE TO RELATED APPLICATION

This application is related to the following copending application which is commonly assigned and is incorporated herein by reference: B. Gorowitz et al., "Motors Including Flexible Multilayer Thin Film Capacitors," U.S. application Ser. No. (attorney docket number RD-24,080), filed concurrently herewith.

BACKGROUND OF THE INVENTION

1. Field of the Invention

The present invention relates generally to capacitors and, more particularly, to flexible multilayer thin film capacitors for applications in specialized shapes.

2. Description of the Related Art

Capacitors are generally fabricated in conventional physical shapes and sizes dictated by the capacitor materials, the manufacturing process, the end use, and the desired electrical properties. Ceramic or thin film multilayer capacitors, for example, can be in the form of chips, whereas other multilayer film capacitors can be in the form of encapsulated rolls. Electrolytic capacitors can be in the form of rolls housed in metal containers. These shapes and packages have wide applications for positioning on or near circuit boards. In a number of other applications, however, space is at a premium and the capacitor shape, in addition to the size, is a critical factor determining the overall size and shape of the electrical assembly.

Several in situ deposited capacitor fabrication techniques that involve the formation of large strips of capacitor elements on a drum or on a long strip or web transported over rolls can be used to form selected capacitor geometries. These capacitor strips have conventionally been subdivided into chip forms for providing mass markets with common capacitor sizes and shapes. One example of this is the polymer monolithic capacitor (PML) fabrication process developed by General Electric Company and performed on a drum in a vacuum chamber, as described in Angelo Yializis et al., "A New High Temperature Multilayer Capacitor with Acrylate Dielectrics," IEEE Transactions on Components, Hybrids, and Manufacturing Technology, Vol. 13, No. 4, 611, December 1990. Employees of Siemens Aktiengesellschaft have described a glow discharge polymerization process for providing dielectric layers which are alternated with vapor deposited metal layers on a drum rotating through vacuum chambers in which the individual deposition processes are performed in Behn, U.S. Pat. No. 4,378,382, Mar. 29, 1983. Another multilayer capacitor fabrication technique is described in J. L. Davidson et al., "Multilevel DLC (Diamondlike Carbon) capacitor structure," SPIE Vol. 871 Space Structures, Power, and Power Conditioning 308 (1988). There is no indication that the capacitors in these fabrication techniques are formed into any shapes other than chips.

Some technologies are capable of making capacitors more compact than electrolytic capacitors while providing beneficial thermal and electrical characteristics. For example, as disclosed in commonly assigned Fisher et al., "Low-Profile Capacitor and Low-Profile Integrated Capacitor/ Heatspreader," application Ser. No. 08/214,508, filed Mar. 18, 1994, an amorphous hydrogenated carbon dielectric material, frequently referred to as "diamond-like carbon" (DLC), has been used at General Electric Company's Research and Development Center to fabricate multilayer chip capacitors which have a potential for having higher energy storage density than capacitors normally available due to the high dielectric strength of the DLC which permits the use of very thin films. However, for capacitance values in the range of 1 microfarad and higher, hundreds and even thousands of layers of dielectric and metal can be required because the dielectric constant of the DLC dielectric material has a range of three to five. Additionally, as the voltage requirement for a capacitor used in a particular application increases, there is a need for greater thickness of the dielectric material, leading to a requirement for an even higher numbers of layers. The high number of layers can increase cost and complexity of fabrication processes, and mechanical stresses which can be created within the capacitor can cause deformations or delaminations.

SUMMARY OF THE INVENTION

According to the present invention, in order to reduce the number of layers of dielectric material required to achieve a given capacitance with the same dielectric constant material, one technique is to increase the area of the capacitor and thereby reduce the number of layers required. This technique reduces manufacturing complexity and mechanical stresses. Furthermore, the increased surface area and reduction in layers can enhance the capability for clearing breakdown sites and provide improved heat transfer which thus decreases vulnerability to thermal breakdown. Another advantage of this technique is that the resulting capacitor is quite thin and more flexible than capacitors having many layers.

Depending on the application, such thin capacitors can occupy too much space. For example, a capacitor with an area of two square centimeters and 1000 layers of dielectric material can be matched in capacitance by a capacitor with an area of two-hundred square centimeters and 10 layers of dielectric material. As a flat panel, such a capacitor might have limited applications.

A flexible multilayer thin film capacitor, however, can be fabricated in such a way as to provide the capability of being cut to various lengths and widths, and being rolled into a coil shape of a selected inside and outside diameter or formed into other shapes most suitable for a specific end application. This fabrication technique provides a capacitor that can be inserted into a variety of housings and, if desired, support other circuit components, such as, for example, integrated circuit chips, discrete circuit elements, or mechanical members. For example, a hollow coiled capacitor or group of capacitors can be fabricated, with other circuit components inserted within or on its inner wall. In addition to the cylindrical or coil shape, the flexible nature of the strip of multilayers forming the capacitor allows it to be shaped into other configurations or be folded, accordion style, for example, within the mechanical limits of the materials.

Briefly, in accordance with a preferred embodiment of the invention, a flexible, multilayer thin film capacitor comprises a flexible substrate and at least two electrode layers mounted on the substrate alternately with at least one dielectric layer. The at least two electrode layers and the dielectric layer are capable of acting as at least one capacitor, and the flexible substrate is capable of being manipulated so as to have a desired shape. The at least one dielectric layer preferably comprises amorphous hydrogenated carbon.

According to another preferred embodiment of the invention, a flexible, multilayer thin film capacitor comprises a flexible substrate comprising an electrically conductive material, at least one dielectric layer overlying the flexible substrate, and at least one electrode layer mounted on the substrate at least partially over the dielectric layer. The substrate, the at least one dielectric layer, and the at least one electrode layer are capable of acting as at least one capacitor, and the flexible substrate is capable of being manipulated so as to have a shape appropriate for a predetermined application.

According to another preferred embodiment of the invention, a flexible, multilayer thin film group of capacitors comprises a flexible substrate; at least two first electrode layers mounted on the substrate alternately with at least one first dielectric layer; and at least two second electrode layers mounted on the substrate alternately with at least one second dielectric layer. The at least two first electrode layers and the at least one first dielectric layer are capable of acting as at least one first capacitor, and the at least two second electrode layers and the at least one second dielectric layer are capable of acting as at least one second capacitor. The flexible substrate is capable of being manipulated so as to have a shape appropriate for a predetermined application.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
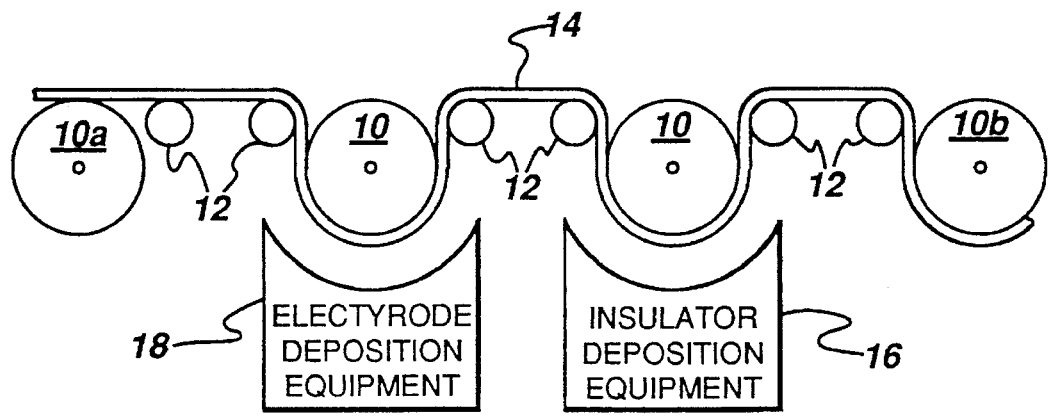
FIG. 1 is a sectional side view of a web of substrate material positioned on roll assemblies for capacitor fabrication.
Figure 2:
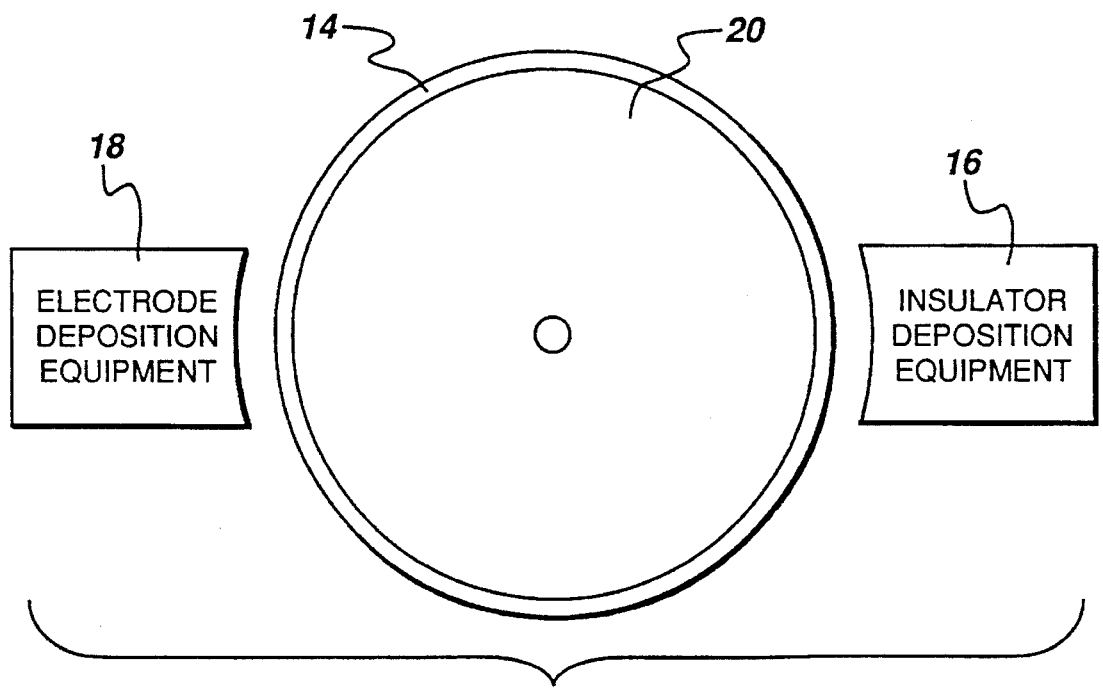
FIG. 2 is a sectional side view of a drum with a substrate surrounding a portion of the drum for capacitor fabrication.

The invention disclosed herein relates to the use of any of several metal deposition processes and dielectric deposition processes, applied in sequence, on a substrate. For example, FIG. 1 is a sectional side view of one embodiment of a capacitor fabrication fixture which includes a web of substrate material 14 passing from a supply roll 10a over roll assemblies 10 and 12 to an output roll 10b, and FIG. 2 is a sectional side view of another embodiment of a capacitor fabrication fixture including a drum 20 with substrate 14 surrounding a portion of the drum. In an alternate embodiment (not shown), the substrate can be transported over on a flat surface where the electrode and insulator deposition takes place in separate sections. The capacitor fabrication process includes the use of electrode deposition equipment 18 and insulator deposition equipment 16.

The substrate may comprise a polyimide film such as Kapton polyimide (Kapton is a trademark of E.I. dupont de Nemours & Co.). Preferably the thickness of the substrate ranges from about 0.5 to 2 mils. Other potential substrate films include polyester films, polyetherimides such as Ultem polyetherimide (Ultem is a trademark of General Electric Company), polycarbonates such as Lexan polycarbonate (Lexan is a trademark of General Electric Company), polytetrafluoroethylenes such as Teflon polytetrafluoroethylene (Teflon is a trademark of E.I. dupont de Nemours & Co.), polypropylene, polyethylene terephthalate, and polyethylene.

Metal foils or sheets comprising materials such as aluminum, molybdenum, copper, stainless steel, titanium, and nickel can be used as substrate films if they are insulated on a surface on which the base electrode will be positioned. Such insulation on the base electrode surface is not needed if the metal foil substrate is designed to operate as an electrode. However if the substrate is a base electrode, insulation is needed either on the surface of the substrate opposite the capacitor or on the surface of the outermost electrode if the capacitor is to be rolled or would otherwise have its base electrode in contact with other electrodes.

In a preferred embodiment: the substrate material is appropriate for forming smooth, defect-free coatings and allowing adhesion of multilayer films; the substrate has mechanical and thermal stability during the capacitor fabrication steps and applications; and the substrate is thin and flexible enough so that it can be shaped as desired even with the addition of dielectric and metal layers.

Figure 3:
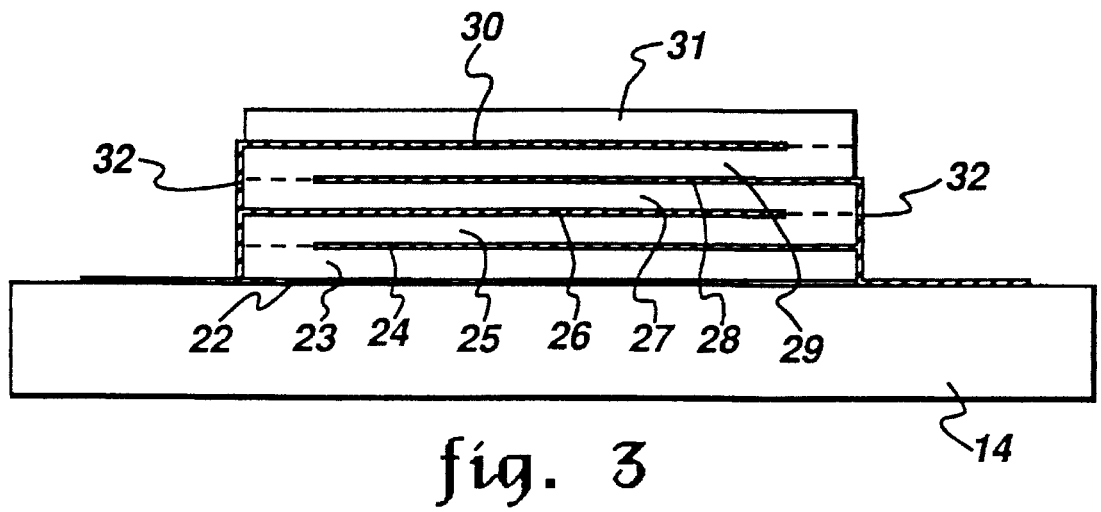
FIG. 3 is a sectional side view of a capacitor structure usable in the present invention.

FIG. 3 is a sectional side view of a capacitor structure usable in the present invention. A process of alternatively depositing electrode layers, shown as metal layers 22, 24, 26, 28, and 30, and insulator layers, shown as dielectric layers 23, 25, 27, 29, and 31, is repeated until the desired capacitance per unit area value is achieved. The number and positions of the dielectric and metal layers are for purposes of example only; other geometries and numbers of layers can be used.

The dielectric layers are insulators which may comprise any electrically insulative material that has appropriate mechanical, electrical, and thermal properties for the intended application. In a preferred embodiment, the dielectric layers comprise hydrogenated amorphous carbon, referred to as DLC. Other thin film dielectric materials can be formed, for example, by plasma polymerization of appropriate gases, electron beam polymerization of appropriate monomers, chemical or plasma assisted chemical vapor deposition, e-beam, thermal or laser beam evaporation or sputtering of solid dielectric sources, ion beam deposition, or excimer laser interactions with appropriate gases at the substrate surface. Further examples of dielectric layer material include, acrylics, Teflon polytetrafluoroethylene, Parylene polyxylylene (Parylene is a trademark of Union Carbide Corp.), plasma polymerized organic materials such as organic silicones, saturated and unsaturated hydrocarbons, fluorinated hydrocarbons, and thin oxides and nitrides of silicon and aluminum. The thickness of a dielectric layer is dictated by the desired rating of the capacitor and typically ranges from about 50 angstroms to 10 micrometers.

The metal layers may comprise electrode materials such as aluminum, titanium, molybdenum, nickel, copper, chromium, gold, silver, platinum, stainless steel, titanium nitride and combinations thereof. The metal layers can typically be applied by evaporation, sputtering, other forms of physical vapor deposition, electroplating, or laser or plasma assisted CVD. The thickness of a metal layer typically ranges from about 100 to 1000 angstroms, and a preferred range is from about 200 to 300 angstroms.

The application of the dielectric and metal layers is preferably accomplished in the vapor phase using appropriate shadow masks which are placed over previously applied layers. Side layers 32 of electrically conductive material can then be applied to couple selected ones of the metal layers. In a preferred embodiment, alternate metal layers are coupled by the side layers.

Figure 4:
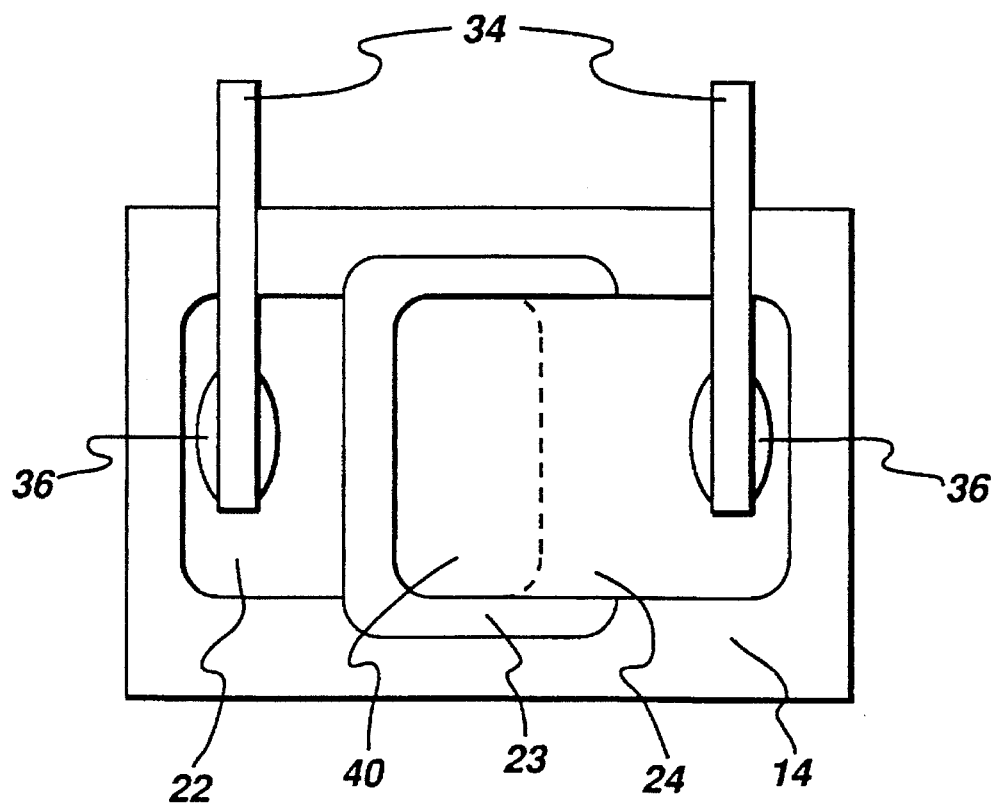
FIG. 4 is a top view of a capacitor structure usable in the present invention.

FIG. 4 is a top view of a capacitor structure usable in the present invention. For simplicity, only two metal layers 22 and 24, separated by a single dielectric layer 23, are shown. It is expected that a number of additional metal and dielectric layers will be used in actual applications. The active area 40 of the capacitor is the area of overlap between metal layer 22, dielectric layer 23, and metal layer 24. After the capacitor is formed, as discussed above, capacitor leads 34 are attached to the metal layers using a conductive adhesive 36. The capacitor leads may comprise electrically conductive materials capable of withstanding the environment in which the capacitor will be used, such as, for example, copper, gold, or aluminum. The conductive adhesive must include electrically conductive material capable of holding the leads in place and remaining conductive in the end-use environment and is preferably somewhat flexible so that it will not crack as the capacitor is shaped into its final form. The adhesive may comprise a material such as an epoxy or a solder, for example.

Figure 5:
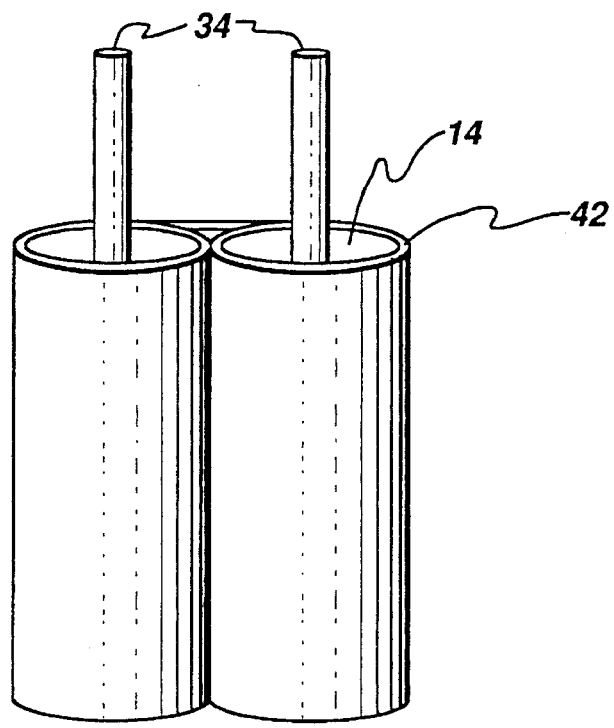
FIG. 5 is a perspective view of the capacitor of FIG. 4 after having been rolled into a desired shape.

After completion of the multilayer deposition and the attachment of leads, substrate 14 can be separated from the fabrication fixture and rolled into a coil shape or into other desired shapes. FIG. 5 is a perspective view of the capacitor of FIG. 4 after having been rolled into a desired shape. To obtain mechanical stability and improve heat transfer, a layer of adhesive 42 can be applied to the face of the capacitor strip so that the turns of the capacitor can be bonded together free of air gaps. This adhesive may comprise materials compatible with the thermal, electrical, and mechanical properties of the capacitor application such as epoxies, polyimides, acrylates, and silicones, for example, and should be applied as thinly as possible so as not to increase the thickness of the capacitor structure any more than is necessary.

Figure 6:
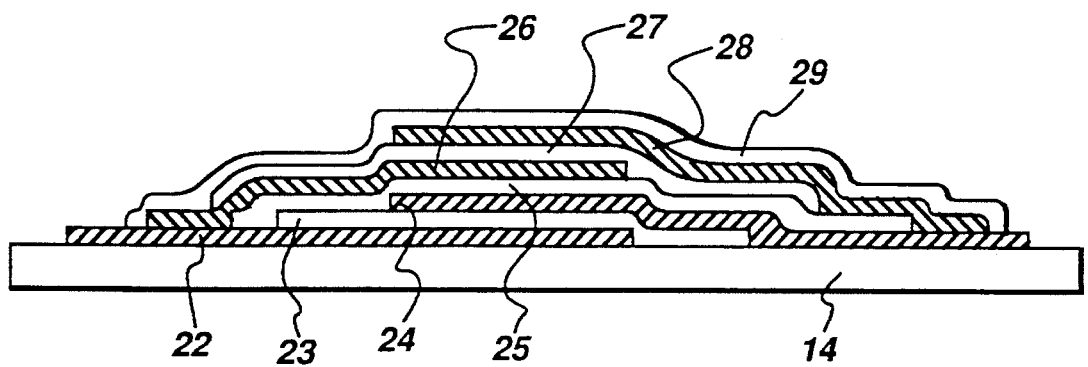
FIG. 6 is a sectional side view of another capacitor structure of the present invention.

FIG. 6 is a sectional side view of another capacitor structure of the present invention. In this embodiment, rather than layering the dielectric layers 23, 25, 27, 29, and 31 and metal layers 22, 24, 26, 28, and 30 in a parallel configuration such as shown in FIG. 3, the shadow masks which are placed over previously applied layers provide areas of coincident overlapping and automatic contacting of alternate metal layers and thus define the outlines of what will become individual capacitors. This embodiment eliminates the need for the side-metallization process discussed with respect to FIG. 3.

Figure 7:
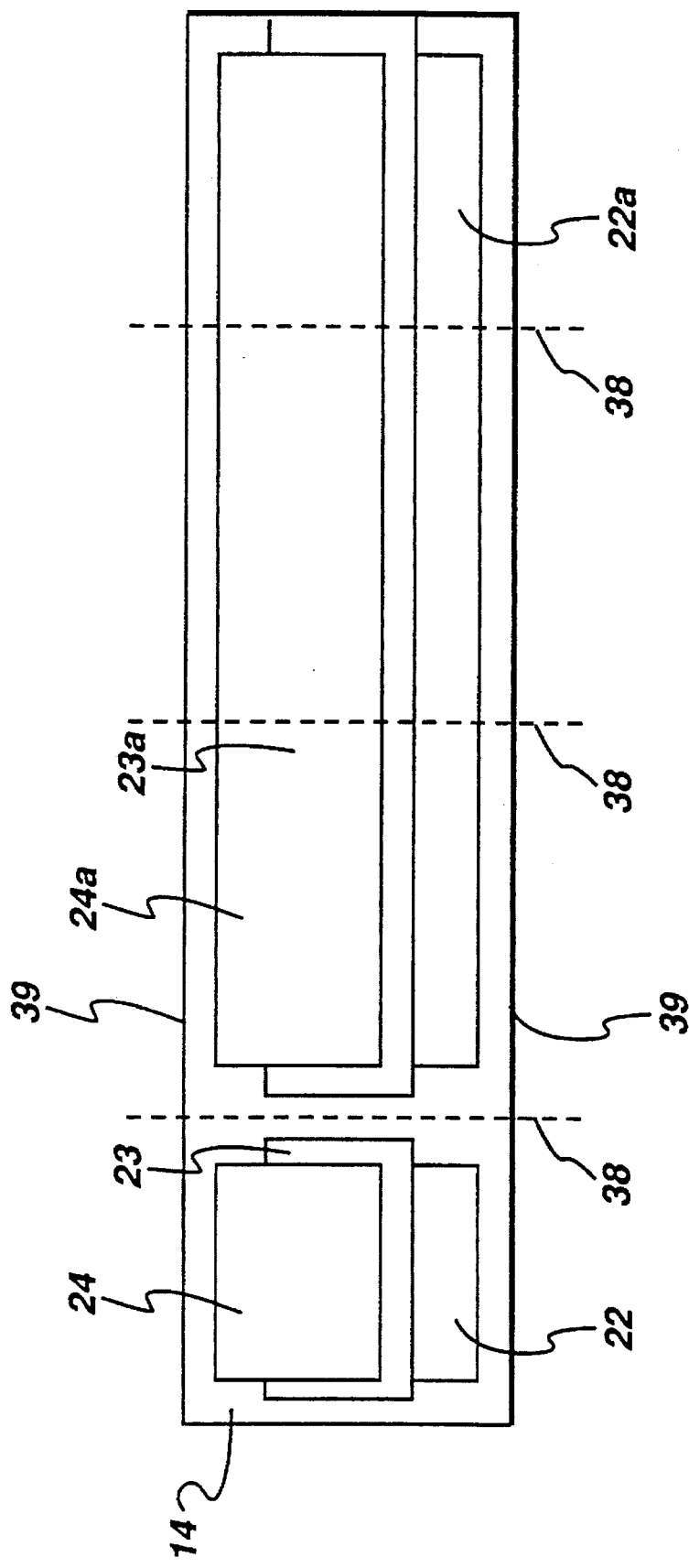
FIG. 7 is a top view of a plurality of capacitors on a single substrate.

FIG. 7 is a top view of a plurality of capacitors on a single substrate 14. The capacitors on substrate 14 can include individual metal plates 22 and 24 as shown, or they can be formed by continuous strips of metal 24a and 22a, if desired. After capacitor fabrication, the capacitors can be cut along lines 38 for example. If a continuous strip of metal is cut, then the sides of the capacitor along lines 38 are preferably etched back because the metal plates can short circuit during the cutting.

When substrate 14 is cut into smaller strips along cut lines 38, the electrodes can be appropriately joined along edges 39 of the strip perpendicular to the cut lines, and the capacitors can then be formed into coils or other shapes that are free-standing and are tailored to the assembly in which they are inserted. To join the electrodes and thus provide terminals for the capacitors, both edges 39 of the capacitor can be metallized by sputtering or other low contact resistance metal joining processes, such as shooping (force firing metal at the ends to join metal layers).

Using the present invention, a ten layer capacitor strip of two-hundred square centimeters can be formed to fit into a cylindrical shell with a diameter of only two centimeters and a length of two centimeters, for example, by making a ribbon capacitor with a width of two centimeters and a length of one hundred centimeters and rolling it into a coil of about 16 turns. With the thickness of each layer of dielectric, including metal electrodes, taken as one micrometer and the thickness of the substrate of about 12 to 25 micrometers, for example, the 10 layer strip would have a thickness of about 22 to 35 micrometers and, after being coiled with sixteen turns, the hollow cylinder would have a wall with a thickness of only about 350 to 560 micrometers. Thus, there would be a minimum impact on the space within the shell and the shell would be left available for the packaging of other components.

When designing a flexible multilayer thin film capacitor, it can be helpful to keep the capacitor strip as thin as possible so that the desired bending and/or folding can be achieved. There are several benefits to this. Reducing the number of layers reduces processing costs and time, as well as allows for a more flexible capacitor.

EXPERIMENT

An initial experiment was performed using a flat panel of flexible substrate. A substrate film of Kapton polyimide about 1 mil thick was attached to a temporary metal support ring so that it was smooth and taut. The substrate was next prepared for metallization with the adhesion enhancement technique of RF sputtering of argon, for example. An ion beam bombardment or chemical etch process can alternatively be used. The substrate was then sputtered with a layer of aluminum about 250 angstroms thick. It is not necessary that the metallization forming the base electric layer be patterned, and in the experiment, it was not The metallized substrate was positioned in a plasma enhanced chemical vapor deposition system. A surface treatment such as a plasma bombardment was first performed. Then a layer of amorphous hydrogenated carbon, frequently referred to as diamond like carbon (DLC), about one micrometer thick was applied through a metal stencil having openings which define the dielectric areas.

A second layer of aluminum metallization was sputtered using a shadow mask positioned so that the openings of the mask define the locations of the top electrodes 24 and 24a of the capacitors. At this point the substrate, which included a plurality of capacitors, was removed from the sputtering area and the capacitors were probed for dielectric integrity. The substrate was removed from the metal support ring, rolled into a cylinder, unrolled, and probed again. The capacitors were found to have retained their original dielectric integrity.

Figure 8:
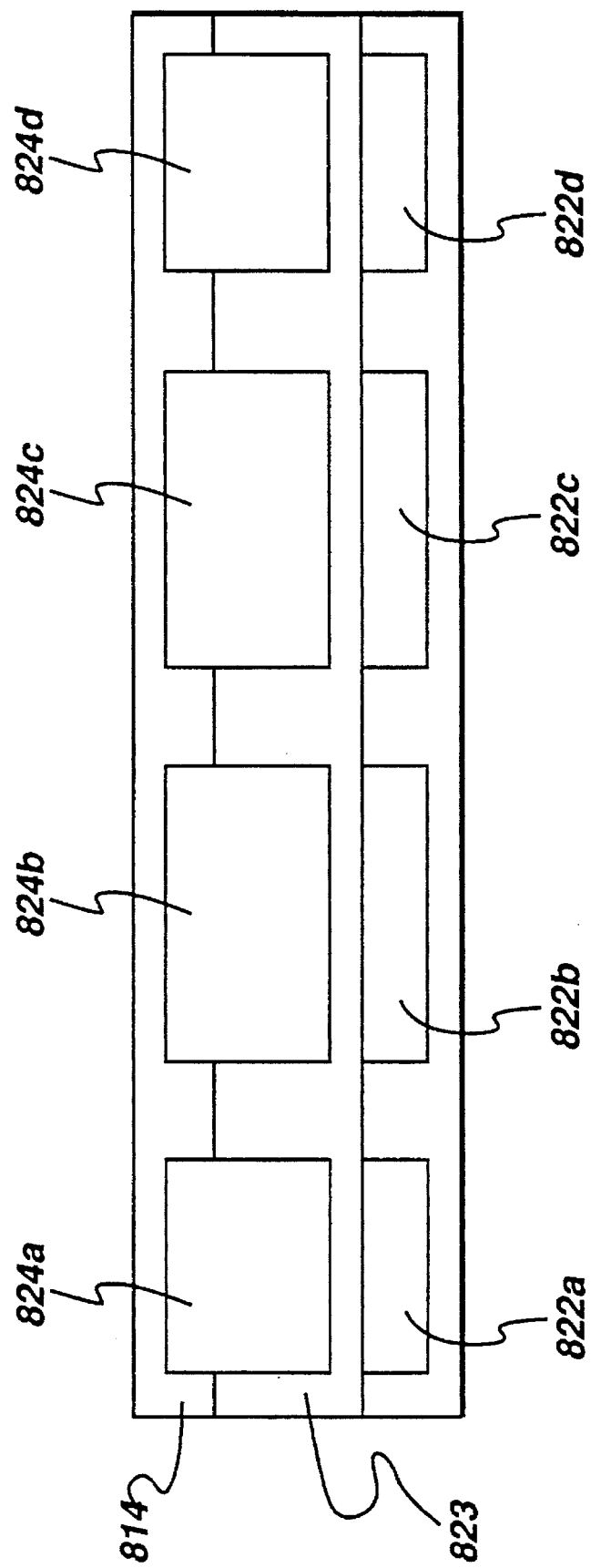
FIG. 8 is another top view of a plurality of capacitors on a single substrate.

FIG. 8 is another top view of a plurality of capacitors on a single substrate. By creating different dimensions of the metal layers 822a, 822b, 822c, and 822d and the corresponding layers 824a, 824b, 824c, and 824d, the capacitance values can be tailored. Furthermore, these capacitors need not be cut into separate strips, but can be left on one strip to create a flexible multi-layer group of capacitors.

Figure 9:
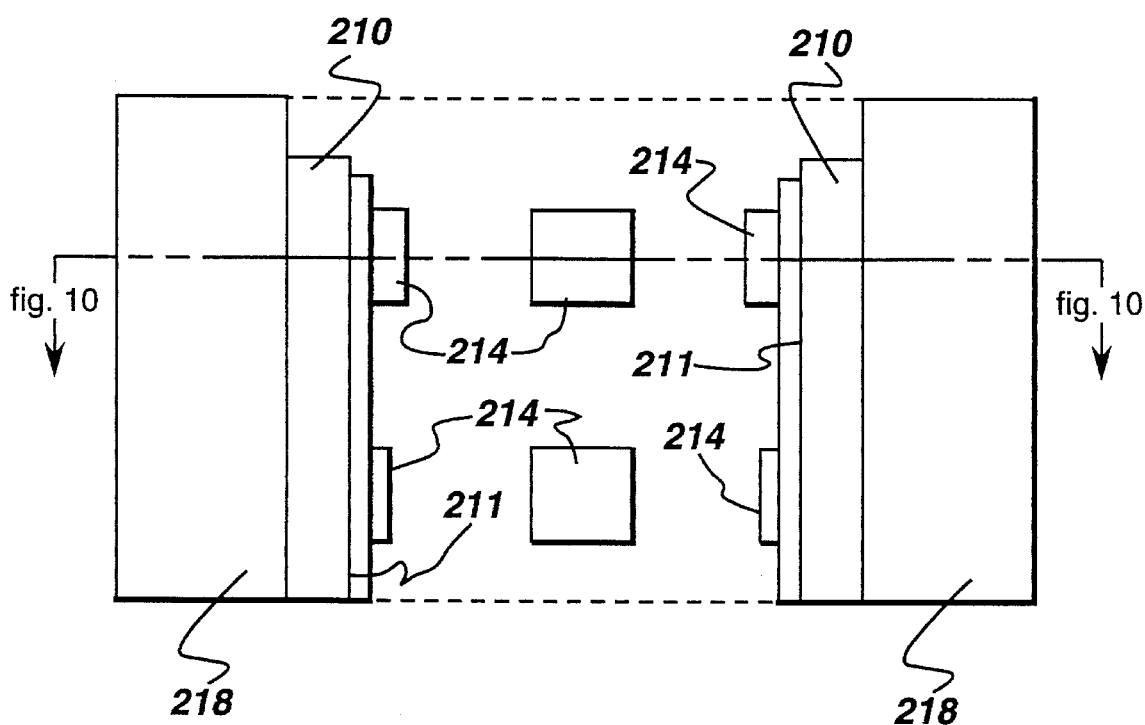
FIGS. 9–11 are views of a capacitor of the present innovation in a cylinder.
Figure 10:
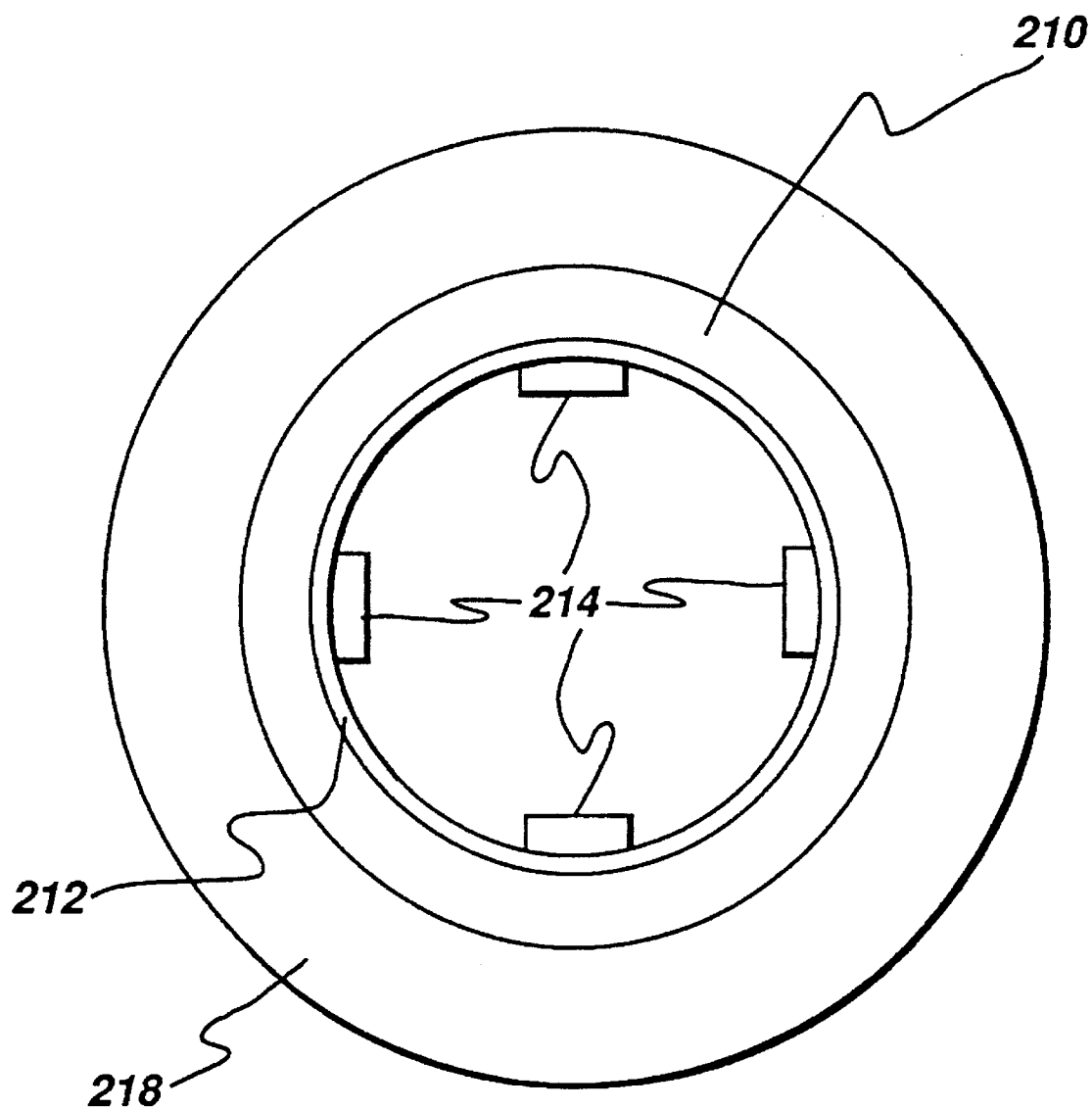
Figure 11:
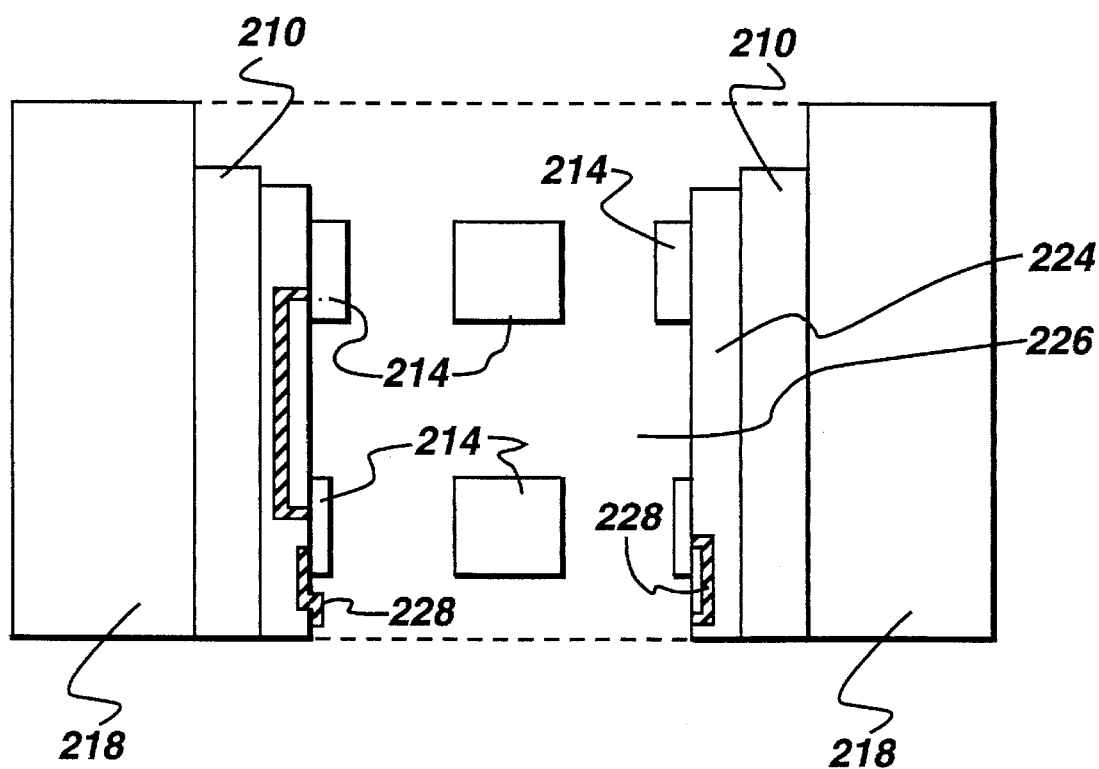

FIGS. 9–11 are views of a capacitor of the present invention in a cylinder. FIG. 9 is a partial sectional side view of a hollow cylinder 218 having a flexible thin film capacitor 210 of the present invention positioned therein. FIG. 10 is a sectional view along line 10—10 of FIG. 9.

This embodiment provides for ease of assembly since the capacitor shape need not be precisely or rigidly prefabricated. Instead the capacitor can be wound into an expandable coil and placed in the cylinder to expand to the approximate shape of the walls of the cylinder.

Circuit components 214 can be positioned within the interior surface 211 of the capacitor. These components can even be attached to the capacitor if desired.

In some embodiments capacitor 210 can be so thin and flexible that direct attachment of components can cause the capacitor to be structurally unstable. In such an embodiment, capacitor 210 can be at least partially coated with structural support material 212 to provide greater structural integrity when attaching circuit components to the capacitor surface. The act of coating can be accomplished for example by dipping the capacitor in a compound such as an epoxy prior to inserting the capacitor into the cylinder. The attachment of circuit components to the capacitor can be attachment to any of the metal layers, the dielectric layer, or a portion of the substrate not covered by either metal or dielectric layers.

FIG. 11 is a view similar to that of FIG. 9 with the addition of a cylindrically shaped circuit board 224 facing the inner surface of the coil formed by capacitor 210. Circuit board 224 can either be a preformed rigid cylinder or a flexible circuit board such as discussed in Cole et al., "Fabrication And Structures of Circuit Modules with Flexible Interconnect Layers," U.S. application Ser. No. 08/321,346, filed Oct. 11, 1994, that has been formed into a coil (which can be expandable) and inserted in the cylinder (preferably after the insertion of the capacitor). Circuit components 214 can be attached to the board and, if desired, interconnected by internal board wiring 228.

To further help in maintaining the structural integrity of the positions of any circuit component which may be present in the cylinder, the interior of the capacitor coil (of, if applicable, the cylindrically shaped circuit board) can be filled with a potting material after the circuit components and any other elements are inserted in the cylinder. The potting material may comprise a material such as, filled or unfilled epoxies or silicones, for example. Inorganic particles are useful for filler material because they can be used to adjust the coefficient of thermal expansion of the potting material.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A flexible multilayer thin film capacitor comprising:

a flexible substrate; and at least two electrode layers mounted on the substrate alternately with at least one dielectric layer, the at least one dielectric layer comprising amorphous hydrogenated carbon, the at least two electrode layers and the at least one dielectric layer capable of acting as at least one capacitor;

the flexible substrate capable of being manipulated so as to have a shape appropriate for a predetermined application.

2. The capacitor of claim 1, wherein the capacitor shape is hollow.

3. The capacitor of claim 1, wherein the at least two electrode layers comprise at least three electrode layers, and further including two side layers, each side layer coupling alternate ones of the at least three electrode layers.

4. The capacitor of claim 1, wherein the at least two electrode layers comprise at least four electrode layers, and wherein alternate ones of the at least four electrode layers overlap and contact.

5. The capacitor of claim 2, wherein the capacitor shape forms a cylinder.

6. The capacitor of claim 5, further including a circuit component positioned within an interior surface of the cylinder.

7. A flexible, multilayer thin film capacitor, comprising:

a flexible substrate comprising an electrically conductive material;

at least one dielectric layer overlying the flexible substrate, the at least one dielectric layer comprising amorphous hydrogenated carbon;

at least one electrode layer mounted on the substrate at least partially over the dielectric layer, the substrate, the at least one dielectric layer, and the at least one electrode layer capable of acting as at least one capacitor;

the flexible substrate capable of being manipulated so as to have a shape appropriate for a predetermined application.

8. A flexible, multilayer thin film group of capacitors, comprising:

a flexible substrate;

at least two first electrode layers mounted on the substrate alternately with at least one first dielectric layer, the at least two first electrode layers and the at least one first dielectric layer capable of acting as at least one first capacitor, the at least one first dielectric layer comprising amorphous hydrogenated carbon; and at least two second electrode layers mounted on the substrate alternately with at least one second dielectric layer, the at least two second electrode layers and the at least one second dielectric layer capable of acting as at least one second capacitor, the at least one second dielectric layer comprising amorphous hydrogenated carbon;

the flexible substrate capable of being manipulated so as to have a shape appropriate for a predetermined application.

9. A method of fabricating a flexible, multilayer thin film capacitor, comprising the steps of:

depositing at least two electrode layers on a flexible substrate alternately with at least one dielectric layer, the at least one dielectric layer comprising amorphous hydrogenated carbon, the at least two electrode layers and the at least one dielectric layer capable of acting as at least one capacitor; and manipulating the flexible substrate into a desired shape.

10. The method of claim 9, wherein the step of providing at least two electrode layers alternately with at least one dielectric layer comprises applying at least three electrode layers alternately with at least two dielectric layers further including applying two electrically conductive side layers for coupling predetermined ones of the at least three electrode layers.

11. The method of claim 9, wherein the step of providing at least two electrode layers alternately with at least one dielectric layer comprises applying at least four electrode layers alternately with at least three dielectric layers so that alternate ones of the at least electrode layers overlap and contact.

12. The method of claim 9, further comprising providing at least two additional electrode layers on the flexible substrate alternately with at least one additional dielectric layer, the at least two additional electrode layers and the at least one additional dielectric layer capable of acting as at least one additional capacitor.

13. The method of claim 9, wherein the step of manipulating the flexible substrate comprises rolling the flexible substrate into a hollow cylinder.

14. The method of claim 13, further including the step situating a circuit component within the hollow cylinder.

15. The capacitor of claim 6, further including potting material within the interior of the cylinder.

16. The capacitor of claim 5, further including structural support material coating at least a portion of an interior surface of the cylinder and a circuit component attached to the structural support material.

17. The capacitor of claim 5, further including a cylindrically shaped circuit board having first and second board surfaces, the first board surface facing a surface of the cylinder, and at least one circuit component situated on the second board surface.

18. The capacitor of claim 5, wherein the cylinder comprises an expandable coil.

* * * * *